(12) United States Patent
Strutt et al.

(10) Patent No.: US 12,504,805 B2
(45) Date of Patent: Dec. 23, 2025

(54) HUMAN PRESENCE DETECTION

(71) Applicant: Elliptic Laboratories ASA, Oslo (NO)

(72) Inventors: Guenael Thomas Strutt, San Francisco, CA (US); Tom Øystein Kavli, Oslo (NO); Eirik Torbjørn Bakken Skjønsfjell, Oslo (NO); Hallstein Skjølsvik, Oslo (NO); Jakob Krohn, Oslo (NO); Tobias Borén Svendsen, Oslo (NO)

(73) Assignee: Elliptic Laboratories ASA, Oslo (NO)

( * ) Notice: Subject to any disclaimer, the term of this patent is extended or adjusted under 35 U.S.C. 154(b) by 120 days.

(21) Appl. No.: 18/562,726

(22) PCT Filed: Jun. 2, 2022

(86) PCT No.: PCT/EP2022/065136
§ 371 (c)(1),
(2) Date: Nov. 20, 2023

(87) PCT Pub. No.: WO2022/258498
PCT Pub. Date: Dec. 15, 2022

(65) Prior Publication Data
US 2024/0231464 A1    Jul. 11, 2024

Related U.S. Application Data

(60) Provisional application No. 63/208,220, filed on Jun. 8, 2021.

(30) Foreign Application Priority Data

Jun. 17, 2021    (NO) .................................... 20210781

(51) Int. Cl.
*G06F 1/00* (2006.01)
*G01S 7/52* (2006.01)
(Continued)

(52) U.S. Cl.
CPC ........ *G06F 1/3231* (2013.01); *G01S 7/52025* (2013.01); *G01S 15/08* (2013.01);
(Continued)

(58) Field of Classification Search
CPC .... G06F 1/3231; G06F 1/3265; G06F 1/3287; G06F 1/325; G06F 1/3215;
(Continued)

(56) References Cited

U.S. PATENT DOCUMENTS

| 6,749,408 B1 | 6/2004 | Eilertsen |
| 7,556,480 B2 | 7/2009 | Eilertsen |

(Continued)

FOREIGN PATENT DOCUMENTS

| CA | 2382668 A1 | 10/2003 |
| EP | 2271134 A1 | 1/2011 |

(Continued)

OTHER PUBLICATIONS

Patent Cooperation Treaty, International Application No. PCT/EP2022/065136, "International Search Report," Oct. 10, 2022, 2 pages.

*Primary Examiner* — Volvick Derose
(74) *Attorney, Agent, or Firm* — Bradley Arant Boult Cummings LLP

(57) ABSTRACT

The present invention relates to a system for monitoring user presence relative to an electronic device, and related method and computer implemented software. The electronic device including at least one acoustic transducer being configured to operate within the ultrasonic range, the least one acoustic transducer being configured to detect a user presence within a predetermined range from the device, wherein the system is configured to turn the at least one transducer off for a predetermined first time period after the detection of a user, at the end of said first time period, activating the acoustic transducer for detecting the user presence.

11 Claims, 2 Drawing Sheets

Figure 1:
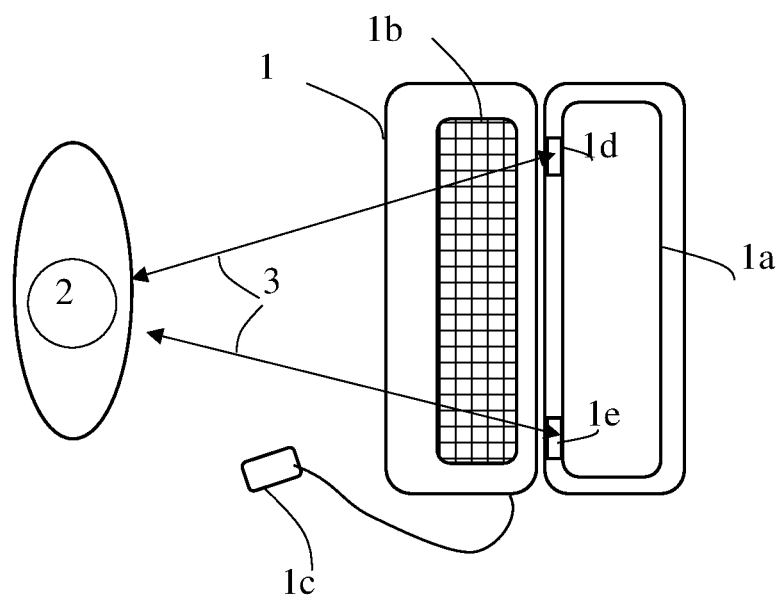

(51) Int. Cl.
    *G01S 15/08*     (2006.01)
    *G01S 15/52*     (2006.01)
    *G06F 1/3231*     (2019.01)
    *G06F 1/3234*     (2019.01)
    *G06F 1/3287*     (2019.01)
    *G06F 1/3203*     (2019.01)

(52) U.S. Cl.
    CPC .......... *G01S 15/526* (2013.01); *G06F 1/3265* (2013.01); *G06F 1/3287* (2013.01); *G06F 1/3203* (2013.01)

(58) Field of Classification Search
    CPC .... G01S 7/52025; G01S 15/08; G01S 15/526; G01S 7/52; G01S 15/04; G01S 15/523; H04M 2250/12; H04M 1/72454; H04M 1/73; H04W 52/0254; H04W 52/028; Y02D 10/00
    USPC ........................................................ 713/323
    See application file for complete search history.

(56) References Cited

U.S. PATENT DOCUMENTS

| | | | | |
|---|---|---|---|---|
| 9,075,435 | B1 * | 7/2015 | Noble | G06F 3/167 |
| 10,467,438 | B1 * | 11/2019 | Renner | G06F 11/2284 |
| 11,050,499 | B1 * | 6/2021 | Tushinskiy | G10L 15/20 |
| 2005/0225442 | A1 * | 10/2005 | Kanayama | G08B 25/008 |
| | | | | 340/539.13 |
| 2007/0286750 | A1 | 12/2007 | Beck et al. | |
| 2009/0160541 | A1 * | 6/2009 | Liu | G09G 5/10 |
| | | | | 327/544 |
| 2010/0315509 | A1 * | 12/2010 | Blanch Puig | G08B 21/22 |
| | | | | 348/154 |
| 2012/0230841 | A1 | 9/2012 | Gregory et al. | |
| 2013/0053099 | A1 * | 2/2013 | Nabata | G01J 5/025 |
| | | | | 455/556.1 |
| 2016/0363116 | A1 | 12/2016 | Gregory | |
| 2018/0321731 | A1 * | 11/2018 | Alfano | G06F 1/3287 |
| 2019/0034609 | A1 * | 1/2019 | Yang | G01P 15/165 |
| 2019/0120218 | A1 | 4/2019 | Hilgers et al. | |
| 2020/0026342 | A1 * | 1/2020 | Sengupta | G06F 3/0416 |
| 2020/0158556 | A1 * | 5/2020 | Strutt | G06F 1/324 |
| 2020/0261608 | A1 * | 8/2020 | Crosby | A61L 2/0047 |
| 2021/0318743 | A1 * | 10/2021 | Partiwala | G06F 1/3287 |
| 2021/0327394 | A1 * | 10/2021 | Bui | G06F 1/3231 |
| 2022/0067346 | A1 * | 3/2022 | Yang | G06V 40/166 |
| 2023/0400906 | A1 * | 12/2023 | Yaoyama | G06F 1/3243 |

FOREIGN PATENT DOCUMENTS

| | | |
|---|---|---|
| WO | WO-9836192 A1 | 8/1998 |
| WO | WO-2009097338 A2 | 8/2009 |
| WO | WO-2020117189 A1 | 6/2020 |
| WO | WO-2023046705 A1 | 3/2023 |

\* cited by examiner

HUMAN PRESENCE DETECTION

The present invention is related to a solution for reducing power consumption of an electronic device, especially a laptop, especially when monitoring presence of a user.

At the present most electronic devices have a defined timeout after which the device is turned off or goes into a hibernation level with reduced power consumption. This is usually based on a time schedule defining the time laps from the last activity such as using the keyboard, touch sensitive surface or mouse. This may be annoying to the user if he or she is watching a movie, a lecture or is just thinking about restructuring a text. Because of this many will adjust the time before power saving until it does not really function as intended.

Other, more advanced systems may use the camera installed in the screen or laptop this may be unpopular for the user not wanting to be monitored by an employer as well as being vulnerably for hacking as well and monitoring of the user actions, in which cases the user simply put a sticker in front of the camera when not actually using it, e.g. for conferences. As an alternative an IR camera used for face recognition may be used to monitor the activity and presence in front of the screen. Another known solution is the use of radar technology for detecting the user presence, e.g. as laptop computers using Novelda Human presence sensors https://novelda.com/technology/. Other systems detecting if a user is present or the distance to a user are known from US2019/034609, US2020/026342 and EP2271134.

The present invention is aimed at the object of monitoring the activity in front of the device while limiting the power consumption of the device. The user should seamlessly experience that when the person approaches, the laptop unlocks, the person leaves and the laptop locks, but without any surprising hibernation or shut downs as long as the user is present.

It is also an object of the present invention to utilize existing features in the computer, such as speakers and microphones, thus being capable of functioning without any changes in the hardware of an ordinary computer or device, although additional active or passive sensors may also be used.

The present invention is aimed at solving the objects as stated above and this is achieved as presented in the accompanying claims.

The present invention preferably takes advantage of the fact that electronic devices such as laptops usually includes acoustic transducers, i.e. speakers and microphones, or is prepared for such external equipment. In addition to the audible range most such transducers are capable of operation within the near ultrasonic range, just outside the audible range. According to the preferred embodiment the system measures the time of flight of acoustic signals from emission at a speaker until the reception at a receiver/microphone. Any changes in this signal indicates a movement and therefore the presence of a user.

The operation of such transducers do, however, require a certain power consumption and it is an additional object of the present invention to achieve a user activity detection without a significant increase in the power consumption of the device.

Therefor it is an object to limited power consumption in the electronic device while monitoring the user presence. This is obtained as specified in the accompanying claims.

Thus the present invention has provided a system and method for reducing the power consumption of an electronic device, by also reducing the power consumption of the control system as such. This is achieved by monitoring the use of the device and after a chosen time period controlling the presence of the user. The time period may depend on a number of factors such as being reset by a movement at the keyboard, touchpad or mouse, or by other registered movement in front of the computer.

The present invention will be described below with reference to the accompanying drawings, illustrating the invention by way of examples.

FIG. 1 illustrates the situation including the user and electronic device according to the invention.

Figure 2A:
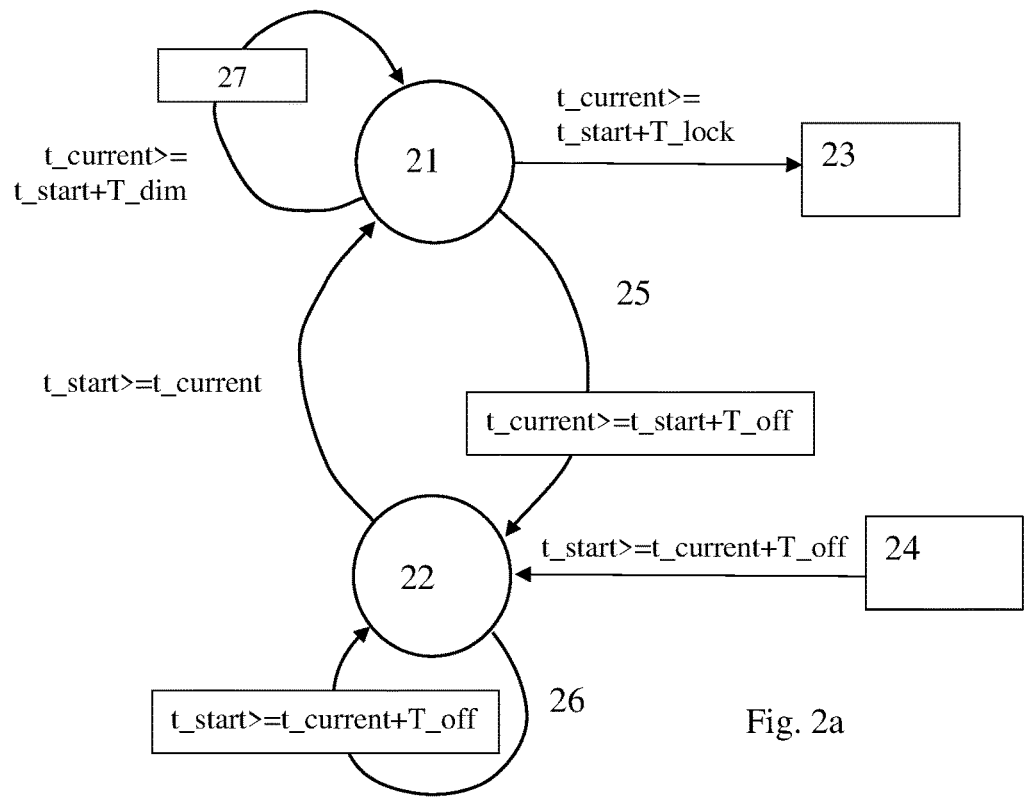

FIG. 2a,b illustrates the time sequences utilized by the preferred embodiment of the present invention.

As is illustrated in FIG. 1 the present invention may involve reducing the power consumption of an electronic device such as a laptop 1. The laptop includes a screen 1a, keyboard 1b, computer mouse 1c as well as possibly a touch pad, and also at least one proximity sensor 1d, 1e being capable of measuring the presence of the user 2.

More specifically the sensors 1d, 1e are preferably acoustic transducers constituting speaker and microphone already present in most computers, being capable of transmitting and receiving, respectively, acoustic signals 3, preferably in the near ultrasound range at 20-25 kHz where transducers already available in the device may be used. The electronic device 1 may then use the acoustic signals 3 to detect and monitor the position and/or movements of the object or person 2 in front of the device 1. From the activity over time a stationary object may be distinguished from a person. In addition, analysis of the properties of the acoustic reflections may also be used to verify the likelihood of the object being a person 2.

The measurements may in a per se known way such as measuring the time laps from emitted to received signal to detect if an object is present in front of the computer within a predetermined distance. By comparing subsequent signals the changes in said time lapse or doppler analysis may be used to confirm user activity by registering movements. The signal may also be analyzed based on historic measurements to be able to distinguish between reflections from stationary objects close to the device and a user moving into the range.

The measurements are preferably achieved by sending and receiving the signals 3 at chosen periods of time and based on the received signal calculating if there is a user present in front of the device, or at least a likelihood of the user presence. The signals 3 may be analyzed in the time domain for calculating distance and chances in distance to a presumed user or using doppler to recognize user movement. The time between the measurements may be adjusted manually but will also depend on the registered activity as well as through other sensors such as keyboard or mouse activity or probability of user presence based on the computer activity.

Previous user activity may be used to construct a power management profile, e.g. by adapting power management schemes based on history (has the laptop been saving power), context (is the laptop plugged in), circumstances (is the user moving a lot and therefore triggering the sensor rapidly or is the environment noisy) or, once presence is ascertained, turn off ultrasound sensing based on probability of user being there. It may also be possible for the system according to the invention to learn the difference between a background signal without a user presence and the signal with a user present.

It is an object of the present invention to use a duty cycling mechanism may be used to reduce the power consumption of the monitoring sensor or sensors 1d, 1e. After a first measurement the sensor may be suspended for periods of 30 to 120 seconds between each duty cycle, depending on design preferences with respect to power versus leave-detection response time before being reactivated. The sensor will run for 1 to 120 seconds in each duty cycle, depending on how quickly it can detect the presence of the user. Simulations indicate that on average, it will run for less than 2 seconds with normal user activity, whereas it will run longer if the user sits very still or is no longer present (e.g. leaves while the sensor is turned off).

Power consumption can be further reduced by 50% to 80% if keyboard and mouse activity is monitored so that the ultrasound sensor is only started when keys/mouse are not in use or have not been in use for a predetermined time period.

To prevent the computer from locking in rare cases when the user sits very still over time, the screen may dim for a few seconds before the computer is locked. The user will quickly learn that only a small motion of the body is needed to undo the dimming and prevent an undesired locking or in combination with a keyboard, touch sensitive device or mouse where the dimming mechanism gives the user the option of moving the mouse, keyboard or touching the device, before the device goes into a sleep mode. In this context, the user will learn to move their body a little to cancel the erroneous Leave sensor output before it happens.

In order to reach a sufficiently low average power consumption average power consumption target, a method has been developed for duty cycling the sensor engine that detects presence from each duty cycle independently. Each duty cycle will consist of an "on time" when the sensor will be run, followed by an "off time" when the sensor will be off. The on and off times will be adaptive, meaning they'll adjust based on sensor events and key/mouse activity detections.

Referring to FIG. 2a the preferred method utilizing the duty cycles is illustrated.

In the drawing the sensor may be in an ON state 21, in which two cycles are maintained after the last registered active incident activating the sensor, defining the time t_start.

In the first cycle in the illustrations shows the dimming function 27 according to the preferred embodiment of the invention where the current time, t_current is compared with t_start+t_dim, where t_dim is defined as the time from t_start till the screen is dimmed to warn the user about a shutdown. If nothing is registered the device will be locked 23 at the time t_start+t_lock, where t_lock>t_dim. The difference between t_lock and t_dim being in the range where one would expect a reaction from the user to the dimming of the screen. If an activity is registered the device is kept on and a new t_start is defined.

The second cycle is related to the sensor state. At the registered user activity 25 the sensor may be turned off 22 for a chosen time periode t_off as it is assumed that the user is active. A new t_start is defined as t_current+t_off, which determines when the sensor is turned on in order to confirm that the user is still present.

While the sensor is off the device will automatically reset the t_start to t_current+t_off when any activity from keyboard, mouse or touch sensitive sensors is registered.

In other words, for each duty cycle, the sensor will run a maximum duration of T_lock time (a predefined timeout period), breaking out of the cycle early if presence is detected due to a user motion or a key/mouse event. Upon reporting presence, the sensor will immediately turn off until the next duty cycle is scheduled to begin. If neither presence nor key/mouse activity is detected within T_lock time, the sensor will report not present and the computer will be locked.

When motion has not been detected for T_dim time within a duty cycle, the screen will be dimmed, causing the user to make an instinctive motion to re-brighten it. Even a small motion in response to the dimming screen will be registered by the sensor; the screen will brighten again and the computer will not lock. Only if the sensor continues to detect no motion until T_lock time has passed since cycle start, the computer will ultimately be locked.

When the sensor is put into "off" mode, it will log a time (t_start=t_current+T_off) when the next duty cycle should occur, where T_off is a predefined off time between duty cycles. All software and hardware components used exclusively by the sensor will be turned off while the sensor is suspended, resulting in essentially zero power consumed by the sensor.

Even when the sensor is in off mode, however, key/mouse activity 26 may be monitored. When a key or mouse event is detected, the start time will reset to t_start=t_current+T_off (delaying the onset of the next duty cycle), since key/mouse events are sufficient to indicate a being present at the laptop.

When the user logs into the system t_start will also be set to t_current+T_off.

When a user leaves the laptop, the response time until the leave is detected and the computer locks will be determined by the T_off and the T_lock parameters. In the first duty cycle after the user has left, the sensor will continuously look for movements of the user until the T_lock time has passed, at which time it will report not present and the computer will be locked.

The "on time" of the sensor during each duty cycle will therefore depend on user behavior. Since sensor activity is immediately suspended when user presence is detected from slight movements of their body, the on time will typically be short when the user is active, and it will be longer when they sit very still, such as when watching a movie. Thus "on time" is directly correlated with the time it takes to detect user presence.

Figure 2B:
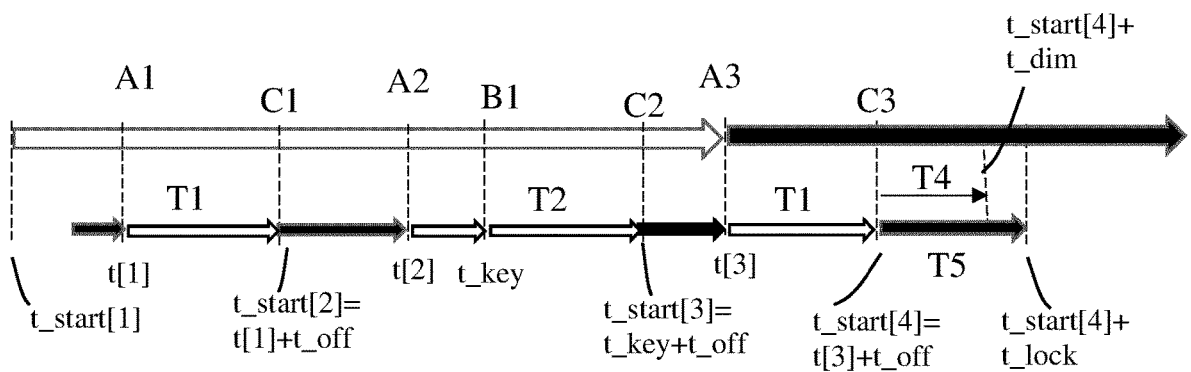

An example scenario is illustrated in FIG. 2b. In a time line from left to right the user is present and the sensor is on t_[1]. At a time A1 (timecount t[1]) a user activity is registered and the sensor is turned off for a predetermined period T1. After the time period T1 (t_off), at the time C1 at t_start[2]=t[1]+t_off, the sensor is activated again and at the time A2 t[2] detects a user present and turns the sensor off again for the first predetermined time period T1. At a later time B1 (t_key) activity from the keyboard is registered which resets or extends the off period T1 with a second predetermined time period T2, which may be equal to T1. After the extended time period T2, at the time t_start[3] =t_key+t_off, the sensor is turned on at C2 and new user movements are registered A3 at time t[3], which turns the sensor off for a new first time period T1. After the time period T1, at t_start[4]=t[3]+t_off, the sensor is activated again but the user has gone away and thus, possibly after a predetermined fourth time periode T4, at t_dim, in which the screen is dimmed, the system may be locked after a fifth predetermined time period T5, at t_start[4]+t_lock, as it is assumed that no user presence is detected and the device may be locked.

The average response time will thus be:

$$T\_average\_response = 0.5 \times T\_off + T\_lock \quad \text{(Eq. 2)}$$

For instance, if we choose T_off=60 and T_lock=90 seconds, the average response time will be 120 seconds.

The choice of desired latency is an open question that should be assessed through practical user testing. We assume a user doesn't want the computer to be locked while they fetch a paper from the printer, and possibly even not when they go away to ask a colleague a short question, so 1 to 3 minutes may not be an unreasonable assumption.

To summarize the present invention relates to a system and corresponding method for monitoring user presence relative to an electronic device. The electronic device including at least one acoustic transducer being configured to operate within the ultrasonic range, the least one acoustic transducer being configured to detect a user presence within a predetermined range from the device. This may be accomplished by pulse-echo measurements, using doppler to detect movements, etc. The system is further configured to turn the at least one transducer off for a predetermined first time period after the detection of a user presence, and at the end of said first time period, activating the acoustic transducer for detecting the user presence.

The device also includes a second transducer constituting a user interface for receiving input from the user thus providing a verification of the user presence. The second transducer is preferably configured to be activated by user input, the system being configured to extend the first time period with a second time period at activation of the second transducer during said first time period. The second transducer may for example be one of a touchpad, computer mouse or keyboards, and wherein a detection of an activity at said computer interface, e.g. when the first transducer is active, the user presence monitor may be configured to be inactive for a third time period.

Preferably the device includes a computer screen and the system is configured to at the end of a selected inactive time period, where the system has failed to register a presence/movement, the system is set to reduce the light intensity on said screen and register if the dimming results in a registered movement or other activity, such as pressing a key, which confirms the user presence.

The acoustic transducer will normally include a transmitter and receiver, or one transducer suitable for both, configured to emit and receive an ultrasonic pulse and measure the time lapse from emission to receipt for measuring the distance to a user or doppler shift to register the movements. The system may also be able to analyze the received signal to store a signal profile with and without the user presence.

In addition, the system may include a third transducer for receiving electromagnetic signals, e.g. infrared signals, for verifying a user presence.

The present invention also related to a method for monitoring user presence relative the electronic device as well as a computer implemented software product for performing said method. The method includes the step of, at the detection of a user, turning the acoustic transducer off for å predetermined time period, and, at the end of said time period, activating said at least one acoustic transducer for detecting if the user is still present.

Using a second transducer the method includes being activated by user input, wherein, at the activation of the second transducer, extending the time period with a predetermined second time period. The second transducer may be a computer interface such as at least one of a touchpad, computer mouse or keyboards, and wherein a detection of an activity at said computer interface the user presence monitor results in a third time period of inactivity for the transducer, where the second T2 and third time period may be identical or similar depending on the type of transducer. The active use of a keyboard may for example result in a longer inactivity time for the presence sensor than a single incident. The device includes a computer screen, the method including the step of, at the end of said selected inactive time period, reducing the light intensity on said screen.

The invention claimed is:

1. A system for monitoring user presence relative to an electronic device, the electronic device comprising:
   at least one acoustic transducer, the at least one acoustic transducer being configured to operate within the ultrasonic range, the least one acoustic transducer being configured to detect a user presence within a predetermined range from the device, wherein the system is configured to turn the at least one transducer off for a predetermined first time period after the detection of a user, at the end of the first time period, activating the at least one acoustic transducer for detecting the user presence; and
   a second transducer constituting a user interface for receiving input from the user, the second transducer being configured to be activated by user input, the system being configured to extend the first time period with a second time period at activation of the second transducer.

2. The system according to claim 1, comprising at least one second transducer being a computer interface such as at least one of a touchpad, computer mouse or keyboard, and wherein at a detection of an activity at the computer interface the user presence monitor is configured to be inactive for a predetermined third time period.

3. The system according to claim 1, wherein the device includes a computer screen, the system being configured to at the end of the selected inactive time period the system, reduce the light intensity on said screen.

4. The system according to claim 1, wherein the acoustic transducer includes a transmitter and receiver configured to emit and receive an ultrasonic pulse and measure the time lapse from emission to receipt for measuring the distance to a user.

5. The system according to claim 4, wherein the system is configured to analyze the received signal to store a signal profile with and without the user presence.

6. The system according to claim 1, wherein the system includes a third transducer for receiving electromagnetic signals for verifying a user presence.

7. The system according to claim 6, wherein the electromagnetic signals are infrared signals.

8. A method for monitoring user presence relative to an electronic device, the electronic device comprising at least one acoustic transducer being configured to operate within the ultrasonic range, the method comprising the at least one acoustic transducer being configured to detect a user presence within a predetermined range from the device, wherein, at the detection of a user, turning the acoustic transducer off for a predetermined time period, and, at the end of the time period, activating the at least one acoustic transducer for detecting if the user is still present; the device comprising a second transducer, the second transducer being configured to be activated by user input, wherein, at the activation of the second transducer, extending the time period with a second predetermined time period.

9. The method according to claim 8, wherein the second transducer is a computer interface constituted by at least one of a touchpad, computer mouse, and keyboards, and wherein a detection of an activity at the computer interface the user presence monitor is configured to be inactive for a third time period.

10. The method according to claim 8, wherein the device includes a computer screen, the method comprising the step of, at the end of the selected inactive time period, reducing the light intensity on the screen.

11. A computer implemented software product configured to execute the method according to claim 8.

\* \* \* \* \*